(12) United States Patent
Yamada et al.

(10) Patent No.: US 8,164,287 B2
(45) Date of Patent: Apr. 24, 2012

(54) MOTOR DRIVE CONTROL APPARATUS AND METHOD

(75) Inventors: Kenji Yamada, Toyota (JP); Hirofumi Kako, Kariya (JP); Takeshi Itoh, Nagoya (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 479 days.

(21) Appl. No.: 12/497,941

(22) Filed: Jul. 6, 2009

(65) Prior Publication Data

US 2010/0001671 A1   Jan. 7, 2010

(30) Foreign Application Priority Data

Jul. 4, 2008   (JP) .................. 2008-176023

(51) Int. Cl.
H02P 23/12   (2006.01)

(52) U.S. Cl. ........... 318/400.14; 318/400.2; 318/400.26; 318/434

(58) Field of Classification Search ............. 318/400.01, 318/400.14, 400.2, 400.26, 434; 180/65.1, 180/65.21, 65.285
See application file for complete search history.

(56) References Cited

U.S. PATENT DOCUMENTS

| | | | |
|---|---|---|---|
| 6,696,812 B2* | 2/2004 | Kaneko et al. ............. | 318/700 |
| 6,822,417 B2* | 11/2004 | Kawaji et al. ............. | 318/701 |
| 7,791,295 B2* | 9/2010 | Oi et al. .................... | 318/432 |
| 7,921,943 B2* | 4/2011 | Ueoka et al. ............... | 180/65.21 |
| 8,044,618 B2* | 10/2011 | Nakatsugawa et al. .. | 318/400.02 |

FOREIGN PATENT DOCUMENTS

| JP | 2000050689 A | 2/2000 |
|---|---|---|
| JP | 2004222448 A | 8/2004 |
| JP | 2007159368 A | 6/2007 |

* cited by examiner

*Primary Examiner* — Walter Benson
*Assistant Examiner* — Thai Dinh
(74) *Attorney, Agent, or Firm* — Gifford, Krass, Sprinkle, Anderson & Citkowski, P.C.

(57) ABSTRACT

In application of a square wave voltage to a motor MG2 to make the motor MG2 output a torque equivalent to a torque command Tm2*, the procedure of square wave control corrects reference phases $\psi b$ and $-\psi b$ as phases for maximizing an absolute value of the output torque of the motor MG2 with a rotational position detection error $\theta err$ and sets the results of the correction to an upper limit phase $\psi ul$ and a lower limit phase $\psi ll$ of the square wave voltage (step S110). A target voltage phase $\psi *$ is set within a phase range defined by the upper limit phase $\psi ul$ and the lower limit phase $\psi ll$, in order to reduce a torque difference between the torque command Tm2* and a torque estimate Tm2est (steps S120 and S130). An inverter 42 is controlled based on the target voltage phase $\psi *$ and a rotational angle $\theta$ of the motor MG2.

4 Claims, 6 Drawing Sheets

MOTOR DRIVE CONTROL APPARATUS AND METHOD

This Application claims priority of Japanese Patent Application No. 2008-176023 filed on Jul. 4, 2008, which is incorporated herein by reference.

BACKGROUND OF THE INVENTION

1. Field of the Invention

The present invention relates to a motor drive control apparatus configured to control operations of an AC motor, as well as to a corresponding motor drive control method.

2. Description of the Prior Art

One proposed motor drive control apparatus disclosed in Japanese Patent Laid-Open No. 2007-159368 is equipped with an inverter for driving an AC motor and, in response to selection of a first control method of applying a square wave voltage to the AC motor, performs feedback control to adjusting the phase of the square wave voltage according to a torque difference relative to a torque command value. This prior art motor drive control apparatus estimates an output torque of the AC motor based on the motor electric current and the rotational position of a rotor in the AC motor, and specifies the phase of the square wave voltage according to a difference between the estimated output torque and the torque command value. The voltage conversion in the inverter is controlled to apply the square wave voltage having the specified phase to the AC motor. Another proposed motor drive control apparatus disclosed in Japanese Patent Laid-Open No. 2004-222448 includes a rotational position sensor arranged to detect a rotational position of a rotor in a motor, an inverter arranged to have multiple different phase arms and supply an ac power to the motor, and a controller of performing square wave control of the motor to provide a switching timing for switching over switching commands to the multiple different phase arms in response to every change of the rotational position by a preset angle as a division of one rotation of the rotor. This prior art motor drive control apparatus specifies one cycle time required for one rotation of the rotor based on a detection value of the rotational position sensor and a time elapsed since a reference time when the detection value of the rotational position sensor shows a reference value corresponding to a preset reference rotational position. The detection value of the rotational position sensor is corrected at each switching timing, based on each elapsed time measured whenever the detection value of the rotational position sensor reaches a value corresponding to each switching timing, one cycle time, and an expected rotational position corresponding to each switching timing. The controller changes over switching commands, based on the corrected detection value.

The square wave control method adopted in the prior art motor drive control apparatus has a lower control accuracy (poorer control response) than the sine wave PWM control method, but effectively enhances the output of the AC motor and improves the energy efficiency with reduction of a potential copper loss or a switching loss. Expansion of the scope of application of the square wave control method in the working range of the AC motor is expected to further improve the energy efficiency and the performance of the motor drive control system including the AC motor. The feedback control for phase adjustment in application of the square wave control method may, however, not ensure output of a maximum torque, which is expected to be output from the AC motor in a certain condition. There is accordingly still a room for improvement in the prior art motor drive control apparatus.

SUMMARY OF THE INVENTION

In the motor drive control apparatus and the corresponding motor drive control method of the invention that applies a square wave voltage to the AC motor to make the AC motor output a torque equivalent to a target torque, there would be a demand for ensuring output of a torque, which is expected to be output from the AC motor.

The present invention accomplishes at least part of the demand mentioned above and the other relevant demands by variety of configurations and arrangements applied to the motor drive control apparatus and the motor drive control method discussed below.

According to a first aspect, the invention is directed to a motor drive control apparatus. The motor drive control apparatus configured to control operation of an AC motor, the motor drive control apparatus comprising:

an inverter arranged to use a voltage supplied from a DC power source and drive the AC motor;

a rotational position detector arranged to detect a rotational position of a rotor in the AC motor;

an error acquisition module configured to obtain a detection error of the rotational position detector;

a limit phase setting module configured to, in application of a square wave voltage from the inverter to the AC motor to make the AC motor output a torque equivalent to a target torque, correct a phase of the square wave voltage for maximizing an absolute value of an output torque of the AC motor with the detection error of the rotational position detector obtained by the error acquisition module and to set the corrected phases to limit phases of the square wave voltage;

a target voltage phase setting module configured to set a target voltage phase of the square wave voltage within a phase range defined by the limit phases set by the limit phase setting module, so as to reduce a torque difference between the target torque and the output torque of the AC motor; and an inverter controller configured to control the inverter based on the rotational position of the rotor in the AC motor detected by the rotational position detector and the target voltage phase set by the target voltage phase setting module.

In application of a square wave voltage from the inverter to the AC motor to make the AC motor output a torque equivalent to a target torque, the motor drive control apparatus according to this aspect of the invention corrects the phases of the square wave voltage for maximizing the absolute value of the output torque of the AC motor with the detection error of the rotational position detector obtained by the error acquisition module and sets the corrected phases to the limit phases of the square wave voltage. The target voltage phase of the square wave voltage is set within the phase range defined by the limit phases set by the limit phase setting module, in order to reduce the torque difference between the target torque and the output torque of the AC motor. The inverter is controlled, based on the set target voltage phase and the rotational position of the rotor in the AC motor detected by the rotational position detector. The motor drive control apparatus of this aspect sets the limit phases of the square wave voltage by taking into account the detection error of the rotational position detector, and sets the target voltage phase of the square wave voltage within the phase range defined by the limit phases. This arrangement effectively prevents the actual phase of the square wave voltage from being out of the range defined by the phases for maximizing the absolute value of the output torque due to the presence of a detection error of the rotational position detector, while preventing untimely restriction of an actual phase change of the square wave voltage before reaching the phases for maximizing the absolute value of the output torque. The arrangement of this aspect thus ensures output of a torque, which is expected to be output from the AC motor.

According to another aspect, the invention is also directed to a motor drive control method corresponding to the motor drive control apparatus discussed above. The motor drive control method of making an AC motor output a torque equivalent to a target torque by using a voltage supplied from a DC power source and applying a square wave voltage from an inverter to the AC motor, the motor drive control method comprising the steps of:

(a) obtaining a detection error of a rotational position detector arranged to detect a rotational position of a rotor in the AC motor;

(b) correcting a phase of the square wave voltage for maximizing an absolute value of an output torque of the AC motor with the detection error of the rotational position detector obtained in the step (a) and setting the corrected phases to limit phases of the square wave voltage;

(c) setting a target voltage phase of the square wave voltage within a phase range defined by the limit phases set in the step (b), so as to reduce a torque difference between the target torque and the output torque of the AC motor; and (d) controlling the inverter based on the rotational position of the rotor in the AC motor detected by the rotational position detector and the target voltage phase set in the step (c).

As described, the motor drive control apparatus of this aspect sets the limit phases of the square wave voltage by taking into account the detection error of the rotational position detector, and sets the target voltage phase of the square wave voltage within the phase range defined by the limit phases. This arrangement effectively prevents the actual phase of the square wave voltage from being out of the range defined by the phases for maximizing the absolute value of the output torque due to the presence of a detection error of the rotational position detector, while preventing untimely restriction of an actual phase change of the square wave voltage before reaching the phases for maximizing the absolute value of the output torque. The arrangement of this aspect thus ensures output of a torque, which is expected to be output from the AC motor.

According to still another aspect, the invention is further directed to another motor drive control apparatus. The motor drive control apparatus configured to control operation of an AC motor, the motor drive control apparatus comprising:

an inverter arranged to use a voltage supplied from a DC power source and drive the AC motor;

an output torque acquisition module configured to obtain an output torque of the AC motor;

a limit phase setting module configured to, in application of a square wave voltage from the inverter to the AC motor to make the AC motor output a torque equivalent to a target torque, set phases of the square wave voltage for maximizing an absolute value of the output torque of the AC motor to limit phases of the square wave voltage and correcting the limit phases to narrow a phase range defined by the limit phases in the case of no increase of the output torque obtained by the output torque acquisition module irrespective of an advance of a phase of the square wave voltage and in the case of no decrease of the output torque obtained by the output torque acquisition module irrespective of a lag of the phase of the square wave voltage;

a target voltage phase setting module configured to set a target voltage phase of the square wave voltage within the phase range defined by the limit phases set by the limit phase setting module, so as to reduce a torque difference between the target torque and the output torque of the AC motor; and an inverter controller configured to control the inverter based on a rotational position of a rotor in the AC motor and the target voltage phase set by the target voltage phase setting module.

In application of a square wave voltage from the inverter to the AC motor to make the AC motor output a torque equivalent to a target torque, the motor drive control apparatus according to this aspect of the invention sets the phases of the square wave voltage for maximizing the absolute value of the output torque of the AC motor to the limit phases of the square wave voltage, and corrects the limit phases to narrow the phase range defined by the limit phases in the case of no increase of the output torque of the AC motor irrespective of an advance of the phase of the square wave voltage and in the case of no decrease of the output torque of the AC motor irrespective of a lag of the phase of the square wave voltage. The target voltage phase of the square wave voltage is set within the phase range defined by the limit phases set by the limit phase setting module, in order to reduce the torque difference between the target torque and the output torque of the AC motor. The inverter is controlled, based on the set target voltage phase and the rotational position of the rotor in the AC motor detected by the rotational position detector. The motor drive control apparatus of this aspect corrects the limit phases of the square wave voltage according to the relation of the torque actually output from the AC motor to the setting condition of the phase of the square wave voltage, and sets the target voltage phase of the square wave voltage within the phase range defined by the limit phases. This arrangement effectively prevents the actual phase of the square wave voltage from being out of the range defined by the phases for maximizing the absolute value of the output torque due to any of various causes. The arrangement of this aspect ensures output of a torque, which is expected to be output from the AC motor.

According to another aspect, the invention is also directed to another motor drive control method corresponding to the motor drive control apparatus discussed above. The motor drive control method of making an AC motor output a torque equivalent to a target torque by using a voltage supplied from a DC power source and applying a square wave voltage from an inverter to the AC motor, the motor drive control method comprising the steps of:

(a) setting phases of the square wave voltage for maximizing an absolute value of an output torque of the AC motor to limit phases of the square wave voltage and correcting the limit phases to narrow a phase range defined by the limit phases in the case of no increase of the output torque of the AC motor irrespective of an advance of a phase of the square wave voltage and in the case of no decrease of the output torque of the AC motor irrespective of a lag of the phase of the square wave voltage;

(b) setting a target voltage phase of the square wave voltage within the phase range defined by the limit phases set in the step (a), so as to reduce a torque difference between the target torque and the output torque of the AC motor; and (c) controlling the inverter based on a rotational position of a rotor in the AC motor and the target voltage phase set in the step (b).

As described, the motor drive control apparatus of this aspect corrects the limit phases of the square wave voltage according to the relation of the torque actually output from the AC motor to the setting condition of the phase of the square wave voltage, and sets the target voltage phase of the square wave voltage within the phase range defined by the limit phases. This arrangement effectively prevents the actual phase of the square wave voltage from being out of the range defined by the phases for maximizing the absolute value of the output torque due to any of various causes. The arrangement of this aspect ensures output of a torque, which is expected to be output from the AC motor.

DESCRIPTION OF THE PREFERRED EMBODIMENTS

Figure 1:
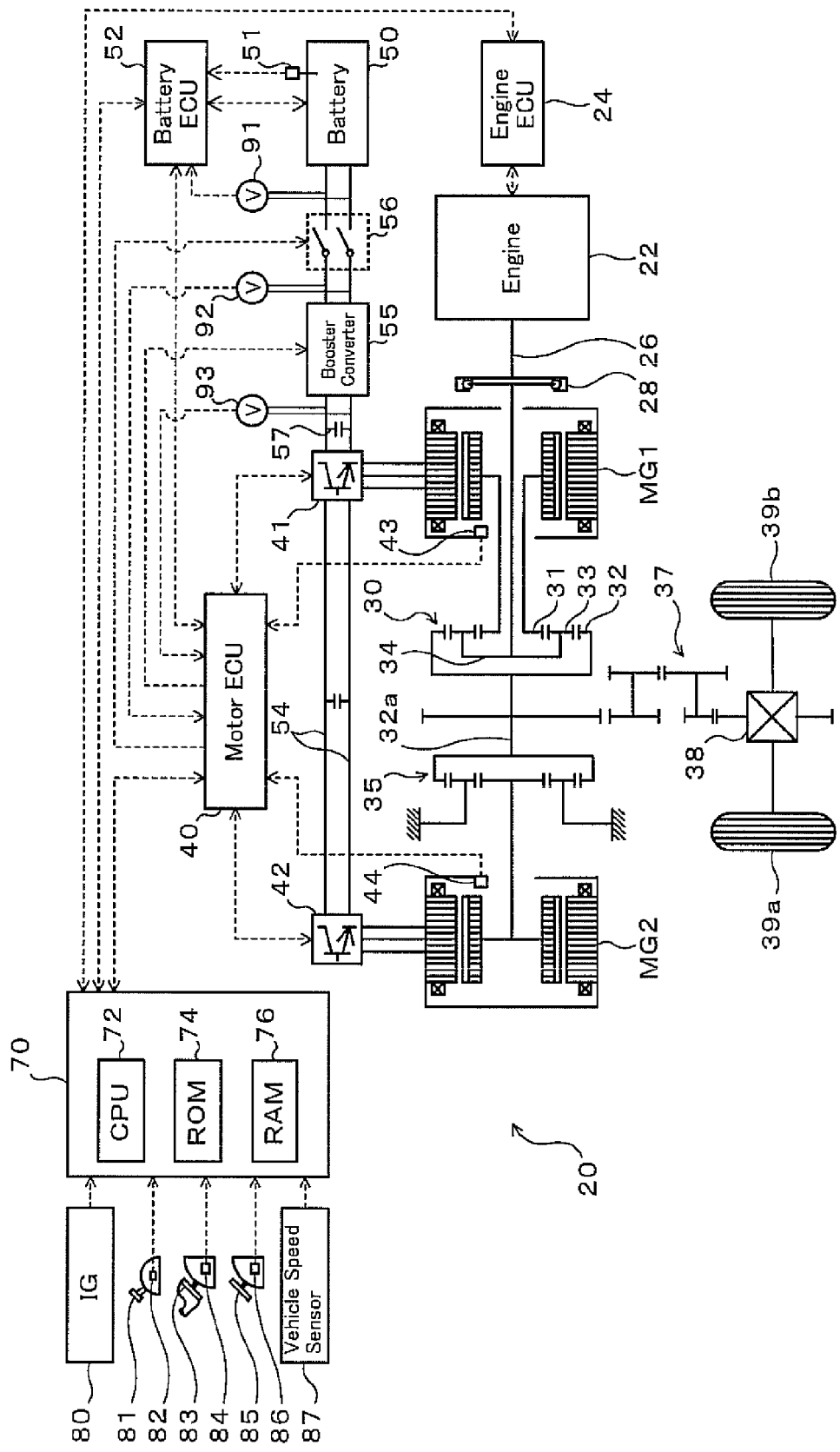
FIG. 1 schematically illustrates the configuration of a hybrid vehicle equipped with a motor drive control apparatus in one embodiment of the invention.
Figure 2:
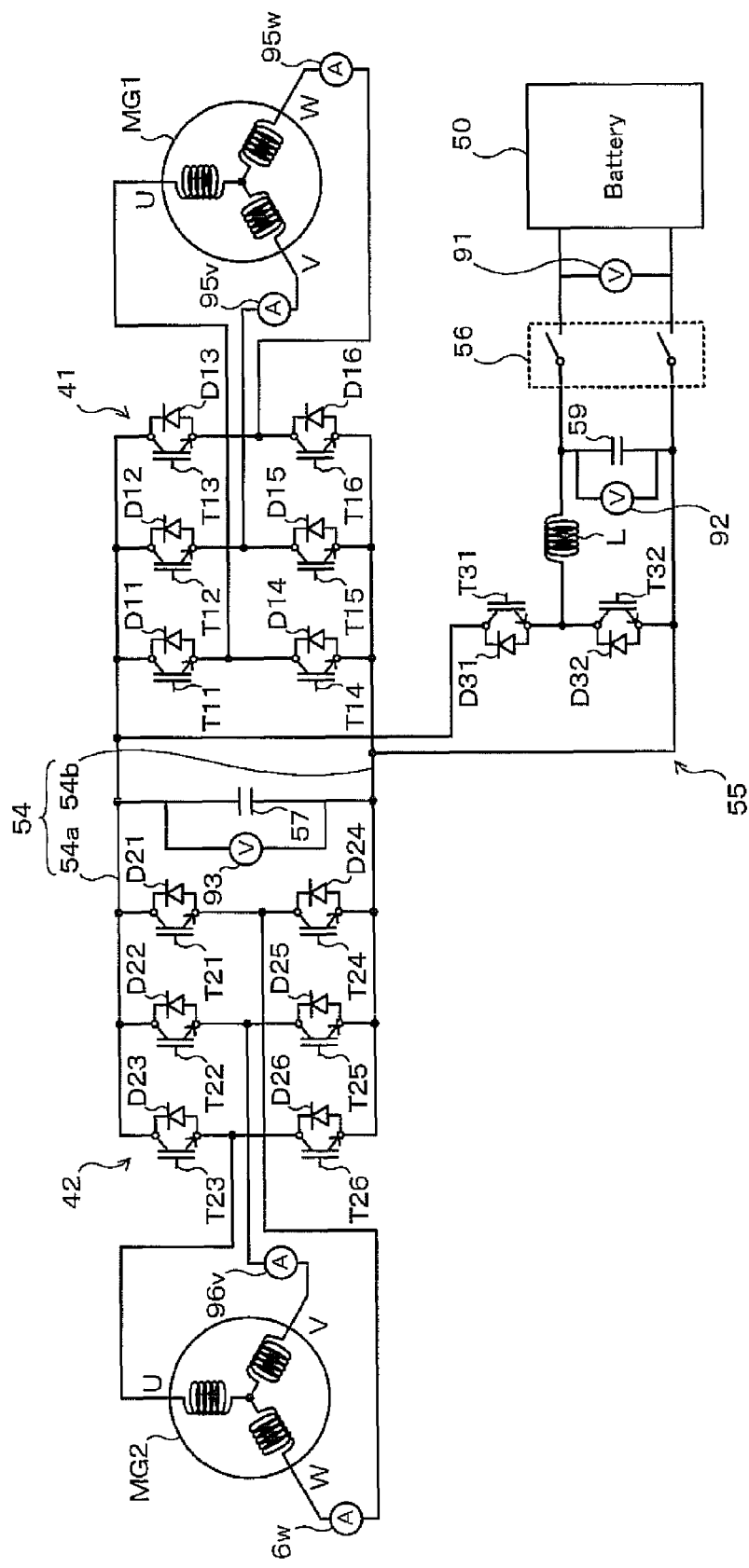
FIG. 2 shows the schematic structure of a motor drive control system including motors MG1 and MG2 included in the hybrid vehicle of the embodiment.

FIG. 1 schematically illustrates the configuration of a hybrid vehicle 20 equipped with a motor drive control apparatus in one embodiment of the invention. FIG. 2 shows the schematic structure of a motor drive control system included in the hybrid vehicle 20. As illustrated, the hybrid vehicle 20 of the embodiment includes an engine 22, a three shaft-type power distribution integration mechanism 30 connected via a damper 28 to a crankshaft 26 or an output shaft of the engine 22, a motor MG1 connected with the power distribution integration mechanism 30 and designed to have power generation capability, a reduction gear 35 attached to a ring gear shaft 32a as an axle linked with the power distribution integration mechanism 30, a motor MG2 connected to the ring gear shaft 32a via the reduction gear 35, inverters 41 and 42 arranged to convert direct-current power into alternating-current power and supply the alternating-current power to the motors MG1 and MG2, a booster converter 55 configured to convert the voltage of electric power output from a battery 50 and supply the converted voltage to the inverters 41 and 42, and a hybrid electronic control unit 70 (hereafter referred to as hybrid ECU) configured to control the operations of the whole hybrid vehicle 20.

The engine 22 is constructed as an internal combustion engine designed to consume a hydrocarbon fuel, such as gasoline or light oil, and generate power. The engine 22 is under operation controls, such as fuel injection control, ignition timing control, and intake air flow control, of an engine electronic control unit 24 (hereafter referred to as engine ECU). The engine ECU 24 inputs diverse signals from various sensors provided for the engine 22 to measure and detect the operating conditions of the engine 22. The engine ECU 24 establishes communication with the hybrid ECU 70 to control the operations of the engine 22 in response to control signals from the hybrid ECU 70 with reference to the diverse signals from the various sensors and to output data regarding the operating conditions of the engine 22 to the hybrid ECU 70 according to the requirements.

The power distribution integration mechanism 30 includes a sun gear 31 as an external gear, a ring gear 32 as an internal gear arranged concentrically with the sun gear 31, multiple pinion gears 33 arranged to engage with the sun gear 31 and with the ring gear 32, and a carrier 34 arranged to hold the multiple pinion gears 33 in such a manner as to allow both their revolutions and their rotations on their axes. The power distribution integration mechanism 30 is thus constructed as a planetary gear mechanism including the sun gear 31, the ring gear 32, and the carrier 34 as the rotational elements of differential motions. The carrier 34 as the engine-side rotational element, the sun gear 31, and the ring gear 32 as the axle-side rotational element in the power distribution integration mechanism 30 are respectively linked to the crankshaft 26 of the engine 22, to the motor MG1, and to the reduction gear 35 via the ring gear shaft 32a. When the motor MG1 functions as a generator, the power distribution integration mechanism 30 distributes the power of the engine 22 input via the carrier 34 into the sun gear 31 and the ring gear 32 corresponding to their gear ratio. When the motor MG1 functions as a motor, on the other hand, the power distribution integration mechanism 30 integrates the power of the engine 22 input via the carrier 34 with the power of the motor MG1 input via the sun gear 31 and outputs the integrated power to the ring gear 32. The power output to the ring gear 32 is transmitted from the ring gear shaft 32a through a gear mechanism 37 and a differential gear 38 and is eventually output to drive wheels 39a and 39b of the hybrid vehicle 20.

The motors MG1 and MG2 are constructed as synchronous generator motors (AC motor) having a rotor with permanent magnets embedded therein and a stator with three-phase coils wounded thereon. The motors MG1 and MG2 transmit electric power to and from the battery 50 as a direct-current power source via the inverters 41 and 42. As shown in FIG. 2, the inverters 41 and 42 respectively have six transistors T11 through T16 and T21 through T26 and six diodes D11 through D16 and D21 through D26 arranged in parallel with but in an opposite direction to the corresponding transistors T11 through T16 and T21 through T26. The transistors T11 through T16 and T21 through T26 are arranged in pairs such that two transistors in each pair respectively function as a source and a sink to a common positive bus 54a and a common negative bus 54b shared as power lines 54 by the inverters 41 and 42. The individual phases of the three-phase coils (U phase, V phase, and W phase) in each of the motors MG1 and MG2 are connected to respective connection points of the three paired transistors. Controlling the rate of an on-time of the paired transistors T11 through T16 or T21 through T26 in the state of voltage application between the positive bus 54a and the negative bus 54b results in generating a revolving magnetic field on the three-phase coils to drive and rotate the motor MG1 or the motor MG2. The inverters 41 and 42 share the positive bus 54a and the negative bus 54b as mentioned above. Such connection enables electric power generated by one of the motors MG1 and MG2 to be consumed by the other motor MG2 or MG1. A smoothing capacitor 57 is connected between the positive bus 54a and the negative bus 54b to smooth the voltage.

The booster converter 55 is connected with the battery 50 via a system main relay 56 and has a transistor T31 (upper arm) and a transistor T32 (lower arm), two diodes D31 and D32 arranged in parallel with but in an opposite direction to the two transistors T31 and T32, and a reactor L. The two transistors T31 and T32 are respectively connected to the positive bus 54a and the negative bus 54b of the inverters 41 and 42, and the reactor L is connected at a connection point of the two transistors T31 and T32. A positive terminal and a negative terminal of the battery 50 are respectively connected via the system main relay 56 to the reactor L and to the negative bus 54b. A smoothing capacitor 59 is also connected between the reactor L and the negative bus 54b to smooth the voltage on the side of the battery 50 in the booster converter 55. A second voltage sensor 92 is provided between terminals of the smoothing capacitor 59. An original voltage level or a pre-boost voltage VL (voltage on the side of the direct-current power source) in the booster converter 55 is obtained from a detection result of the second voltage sensor 92. Switching control of the transistors T31 and T32 boosts the voltage of the direct-current power (pre-boost voltage VL) from the battery 50 and supplies the boosted voltage to the inverters 41 and 42. A boosted voltage VH (voltage on the side of the motor drive circuit) in the booster converter 55 to be supplied to the inverters 41 and 42 is obtained from a detection result of a third voltage sensor 93 provided between terminals of the smoothing capacitor 57. Switching control of the transistors T31 and T32 in the booster converter 55 steps down the direct-current voltage applied to the positive bus 54a and the negative bus 54b to charge the battery 50.

The inverters 41 and 42 and the booster converter 55 are under control of a motor electronic control unit 40 (hereafter referred to as 'motor ECU') to drive and control the motors MG1 and MG2. The motor ECU 40 is constructed as a microprocessor including a CPU (not shown), a ROM configured to store processing programs, a RAM configured to temporarily store data, input and output ports (not shown), and a communication port (not shown). The motor ECU 40 inputs various signals required for driving and controlling the motors MG1 and MG2, for example, signals representing rotational positions (rotational angle θ) of rotors in the motors MG1 and MG2 from rotational position detection sensors (resolvers) 43 and 44, signals representing the pre-boost voltage VL from the second voltage sensor 92 and the boosted voltage VH from the third voltage sensor 93, and signals representing phase currents to be applied to the motors MG1 and MG2 from current sensors 95v, 95w, 96v, and 96w (see FIG. 2). The motor ECU 40 outputs switching control signals to the inverters 41 and 42, a driving signal to the system main relay 56, and a switching control signal to the booster converter 55. The motor ECU 40 establishes communication with a battery electronic control unit 52 (discussed later, hereafter referred to as battery ECU) and the hybrid ECU 70 to drive and control the motors MG1 and MG2 in response to control signals received from the hybrid ECU 70 and signals received from the battery ECU 52 with reference to the signals from the sensors. The motor ECU 40 computes and obtains data regarding the operating conditions of the motors MG1 and MG2, for example, computing rotation speeds Nm1 and Nm2 of the motors MG1 and MG2 from the signals of the rotational position detection sensors 43 and 44, and outputs the computed and obtained data to the hybrid ECU 70 or other relevant elements according to the requirements.

The battery 50, a nickel hydrogen battery or a lithium ion battery in this embodiment, is under control and management of the battery ECU 52. The battery ECU 52 inputs various signals required for management and control of the battery 50, for example, an inter-terminal voltage VB from a first voltage sensor 91 provided between terminals of the battery 50, a charge-discharge current from a current sensor (not shown) located in the power line 54 connecting with the output terminal of the battery 50, and a battery temperature Tb from a temperature sensor 51 attached to the battery 50. The battery ECU 52 outputs data regarding the operating conditions of the battery 50 by communication to the hybrid ECU 70 and the engine ECU 24 according to the requirements. The battery ECU 52 also performs various arithmetic operations for management and control of the battery 50. A remaining charge or state of charge SOC of the battery 50 is calculated from an integrated value of the charge-discharge current measured by the current sensor. A charge-discharge power demand Pb* of the battery 50 is set based on the calculated state of charge SOC of the battery 50. An input limit Win as an allowable charging electric power to be charged in the battery 50 and an output limit Wout as an allowable discharging electric power to be discharged from the battery 50 are set corresponding to the calculated state of charge SOC and the battery temperature Tb. A concrete procedure of setting the input and output limits Win and Wout of the battery 50 sets base values of the input limit Win and the output limit Wout corresponding to the battery temperature Tb, specifies an input limit correction factor and an output limit correction factor corresponding to the state of charge SOC of the battery 50, and multiplies the base values of the input limit Win and the output limit Wout by the specified input limit correction factor and output limit correction factor to determine the input limit Win and the output limit Wout of the battery 50.

The hybrid ECU 70 is constructed as a microprocessor including a CPU 72, a ROM 74 configured to store processing programs, a RAM 76 configured to temporarily store data, input and output ports (not shown), and a communication port (not shown). The hybrid ECU 70 inputs, via its input port, an ignition signal from an ignition switch (start switch) 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal stroke BS or the driver's depression amount of a brake pedal 85 from a brake pedal stroke sensor 86, and a vehicle speed V from a vehicle speed sensor 87. The hybrid ECU 70 makes connection with the engine ECU 24, the motor ECU 40, and the battery ECU 52 via its communication port to transmit various control signals and data to and from the engine ECU 24, the motor ECU 40, and the battery ECU 52 as mentioned previously.

During a drive of the hybrid vehicle 20, the hybrid ECU 70 computes a torque demand Tr*, which is to be output to the ring gear shaft 32a as the axle, from the vehicle speed V and the accelerator opening Acc corresponding to the driver's depression amount of the accelerator pedal 83, and sets a target rotation speed Ne* and a target torque Te* of the engine 22, a torque command Tm1* or a target torque of the motor MG1, and a torque command Tm2* or a target torque of the motor MG2 to ensure output of a torque equivalent to the computed torque demand Tr* to the ring gear shaft 32a. The hybrid vehicle 20 of the embodiment has several drive control modes of the engine 22 and the motors MG1 and MG2 including a torque conversion drive mode, a charge-discharge drive mode, and a motor drive mode. In the torque conversion drive mode, the hybrid ECU 70 sets the target rotation speed Ne* and the target torque Te* of the engine 22 to ensure output of a power from the engine 22 that is equivalent to the torque demand Tr*, while setting the torque commands Tm1* and Tm2* of the motors MG1 and MG2 to enable all the output power of the engine 22 to be subjected to torque conversion by the power distribution integration mechanism 30 and the motors MG1 and MG2 and to be output to the ring gear shaft 32a. In the charge-discharge drive mode, the hybrid ECU 70 sets the target rotation speed Ne* and the target torque Te* of the engine 22 to ensure output of a power from the engine 22 that is equivalent to the sum of the torque demand Tr* and a charge-discharge power demand Pb* to be charged into or discharged from the battery 50, while setting the torque commands Tm1* and Tm2* of the motors MG1 and MG2 to enable all or part of the output power of the engine 22 with charge or discharge of the battery 50 to be subjected to torque conversion by the power distribution integration mechanism 30 and the motors MG1 and MG2 and to ensure output of a torque equivalent to the torque demand Tr* to the ring gear shaft 32a. The hybrid vehicle 20 of the embodiment performs intermittent operations of the engine 22 to automatically stop and restart the operation of the engine 22 upon satisfaction of a predetermined condition in the torque conversion drive mode or in the charge-discharge drive mode. In the motor drive mode, the hybrid ECU 70 stops the operation of the engine 22 and controls the motor MG2 to output a torque equivalent to the torque demand Tr* to the ring gear shaft 32a. In this case, the hybrid ECU 70 sets 0 to the target rotation speed Ne* and the target torque Te* of the engine 22 and the torque command Tm1* of the motor MG1 and sets the torque command Tm2* of the motor MG2 based on the torque demand Tr*, a gear ratio ρ of the power distribution integration mechanism 30, and a gear ratio Gr of the reduction gear 35. The hybrid ECU 70 starts the operation of the engine 22 in response to a requirement for a start of the engine 22 during drive of the hybrid vehicle 20 is stopped or drive of the hybrid vehicle 20 in the motor drive mode. In this case, the hybrid ECU 70 drives and controls the motor MG1 to crank the engine 22, while setting the torque commands Tm1* and Tm2* of the motors MG1 and MG2 to ensure output of a torque equivalent to the torque demand Tr* to the ring gear shaft 32a while canceling a torque as a reactive force to a drive torque applied to the ring gear shaft 32a in the course of cranking the engine 22.

Figure 3:
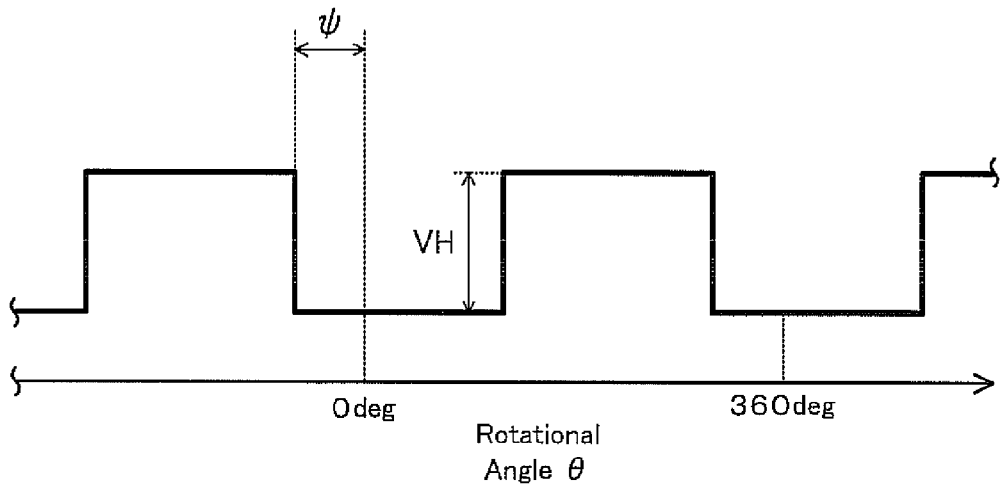
FIG. 3 is an explanatory view showing a variation in square wave voltage applied to the motor MG2 against rotational angle θ of a rotor in the motor MG2.

After setting the target rotation speed Ne* and the target torque Te* of the engine 22 and the torque commands Tm1* and Tm2* of the motors MG1 and MG2, the hybrid ECU 70 sends the settings of the target rotation speed Ne* and the target torque Te* of the engine 22 to the engine ECU 24 and the settings of the torque commands Tm1* and Tm2* of the motors MG1 and MG2 to the motor ECU 40. The engine ECU 24 controls the engine 22 to be drive at a drive point defined by the target rotation speed Ne* and the target torque Te* received from the hybrid ECU 70. The motor ECU 40 performs switching control of the inverters 41 and 42 to respectively drive the motor MG1 and the motor MG2 with the torque command Tm1* and with the torque command Tm2* received from the hybrid ECU 70. In the configuration of the embodiment, the motor ECU 40 adopts one of three controls for switching control of the inverters 41 and 42, sine-wave PWM control with a sine-wave PWM voltage, overmodulation PWM control with an overmodulation PWM voltage, and rectangular-wave control with a rectangular-wave voltage, based on the torque commands Tm1* and Tm2* and the rotation speeds Nm1 and Nm2 of the motors MG1 and MG2. The sine-wave PWM control is generally referred to as 'PWM control' and controls on and off the transistors T11 through T16 and the transistors T21 through T26 according to a voltage difference between a voltage command value in a sinusoidal waveform and a voltage of a triangular wave or another carrier wave to obtain an output voltage (PWM voltage) having a sinusoidal fundamental wave component. In the sine-wave PWM control, a modulation factor Kmd as a ratio of the output voltage (the amplitude of the fundamental wave component) to the boosted voltage VH (inverter input voltage) supplied from the booster converter 55 (the smoothing capacitor 57) is set approximately in a range of 0 to 0.61. The overmodulation PWM control distorts the carrier wave to reduce the amplitude of the carrier wave and then performs the control of the sine-wave PWM control. In the overmodulation PWM control, the modulation factor Kmd is set approximately in a range of 0.61 to 0.78. The rectangular-wave control theoretically generates a fundamental wave component having a maximum amplitude and controls the motor torque by varying the phase of a rectangular voltage having a fixed amplitude (voltage phase based on a q-axis, see FIG. 3) according to the torque command. In the rectangular-wave control, the modulation factor Kmd is kept at a substantially constant value (approximately equal to 0.78). The control accuracy (control response) of the inverters 41 and 42 (the motors MG1 and MG2) decreases in the sequence of the sine-wave PWM control, the overmodulation PWM control, and the rectangular-wave control. The rectangular-wave control enhances the voltage utilization of the direct-current power source and prevents a copper loss and a switching loss to improve the energy efficiency. In a high-speed rotation zone with the high rotation speeds of the motors MG1 and MG2, the rectangular-wave control is basically adopted for the switching control. In this case, field weakening control is performed to supply field weakening current and make the boosted voltage VH, which is to be supplied to the inverters 41 and 42 side, higher than an induced voltage generated in the motors MG1 and MG2. In the hybrid vehicle 20 of the embodiment, the motor ECU 40 controls the booster converter 55 to boost a rated voltage of the battery 50 (for example, DC288V) to a predetermined voltage level (for example, 650 V at the maximum) according to a target operation point of the motor MG1 or MG2 (specified by the torque command Tm1* or Tm2* and the current rotation speed Nm1 or Nm2).

Figure 4:
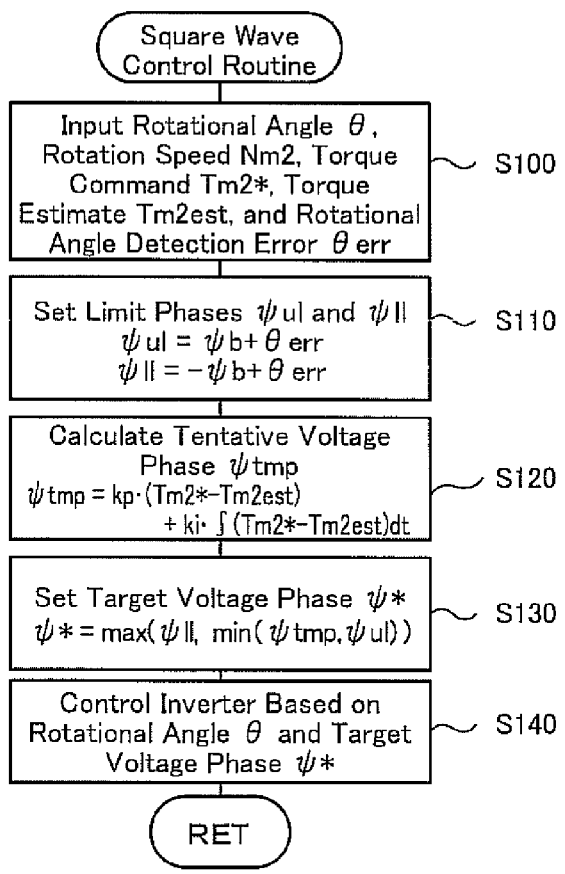
FIG. 4 is a flowchart showing a square wave control routine performed by a motor ECU in the hybrid vehicle of the embodiment.

The following describes the operations of the hybrid vehicle 20 of the embodiment configured as discussed above, especially a procedure of controlling the motor MG2 (inverter 42) arranged to output the driving power to the ring gear shaft 32a by the square wave control method. FIG. 4 is a flowchart showing a square wave control routine repeatedly performed at preset time intervals by the motor ECU 40 of the embodiment to control the motor MG2 by the square wave control method. The square wave control routine of FIG. 4 is similarly performed to control the motor MG1 by the square wave control method.

On the start of the square wave control routine of FIG. 4, the CPU (not shown) of the motor ECU 40 inputs various data required for control, for example, the rotational angle θ of the rotor in the motor MG2 detected by the rotational position detection sensor 44, the present rotation speed Nm2 of the motor MG2, the torque command Tm2* of the motor MG2 set by the hybrid ECU 70, a torque estimate Tm2est or an estimate value of torque output from the motor MG2, and a rotational angle detection error θerr or a detection error of the rotational position detection sensor 44 (step S100). The present rotation speed Nm2 of the motor MG2 is calculated from the rotational angle θ detected by the rotational position detection sensor 44. The torque estimate Tm2est is estimable from current values Id and Iq of the d-axis and the q-axis that are obtained by coordinate transformation of the phase currents Iu and Iv of the U-phase and the V-phase among the three-phase coils of the motor MG2. A concrete procedure of the embodiment refers to a torque estimate map created in advance to define the relation of the output torque of the motor MG2 to the current values Id and Iq of the d-axis and the q-axis and reads an output torque as the torque estimate Tm2est corresponding to the current values Id and Iq obtained from the observed values of the phase currents Iu and Iv from the torque estimate map. The rotational angle detection error θerr or the detection error of the rotational position detection sensor 44 is calculated by the motor ECU 40 as an angle deviation in every 60 degrees according to a rotational angle detection error calculation routine (not shown) on the basis of the technique disclosed in Japanese Patent Publication No. 4,007,197.

After the data input at step S100, the CPU sets an upper limit phase ψul and a lower limit phase ψll as an upper limit value and a lower limit value of the phase of a square wave voltage applied from the inverter 42 to the motor MG2 (step S110). In this embodiment, the sum of a reference phase ψb (positive phase) as a specific phase value maximizing the output torque of the motor MG2 under the condition of the rotational angle detection error θerr=0 and the rotational angle detection error θerr input at step S100 is set to the upper limit phase ψul. The sum of a reference phase −ψb as a specific phase value minimizing the output torque of the motor MG2 under the condition of the rotational angle detection error θerr=0 and the rotational angle detection error θerr input at step S100 is set to the lower limit phase ψll. There is a relation between voltage phase ψ and output torque T of a motor shown as Equation (1) given below:

$$T = \frac{p}{2} \cdot \frac{\left(\frac{\sqrt{6}}{\pi}\right)^2 \cdot (Ld - Lq)}{Ld \cdot Lq} \cdot \left(\frac{VH}{\omega}\right)^2 \cdot \sin 2\psi + p \cdot \varphi \cdot \frac{\frac{\sqrt{6}}{\pi} \cdot VH}{\omega \cdot Ld} \cdot \sin\psi \quad (1)$$

Figure 5:
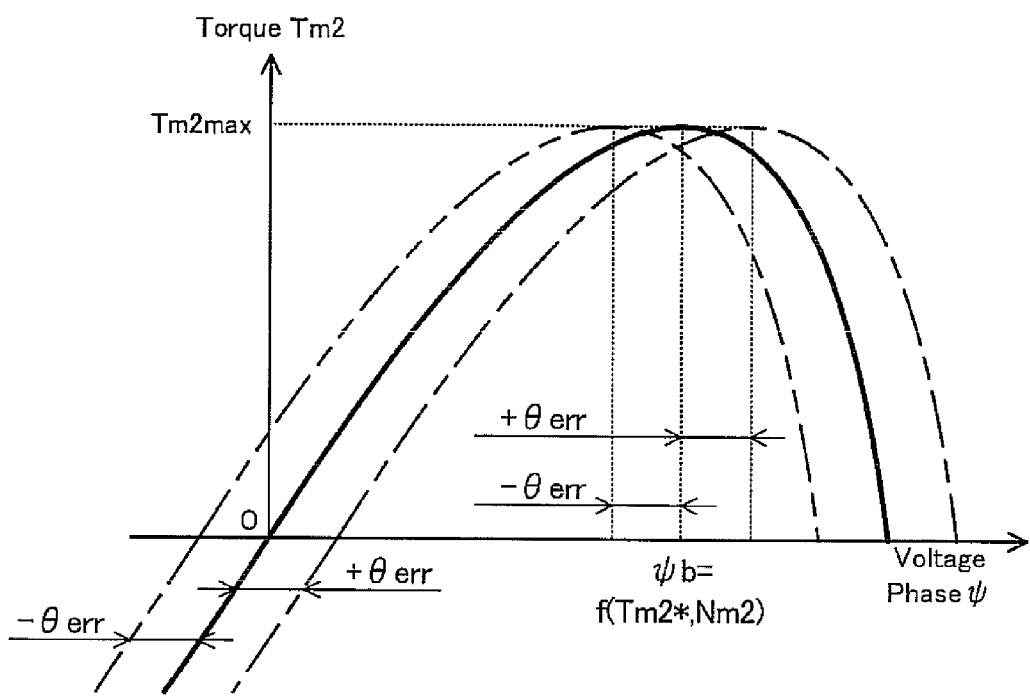
FIG. 5 shows relations of output torque of the motor MG2 to voltage phase $\psi$.

In Equation (1), 'p', 'φ', 'Ld', 'Lq', 'ω', and 'ψ' represent the number of pole pairs, the number of flux linkages, the inductance of the d-axis, the inductance of the q-axis, the angular speed of the motor (=2π×rotation speed), and the voltage phase. A map (not shown) is created in advance according to Equation (1) given above to define the relation of the reference phase ψb to the torque command Tm2* and the rotation speed Nm2 (boosted voltage VH, angular speed ω, and the number of flux linkages φ) of the motor MG2 and is stored in a storage unit (not shown) of the motor ECU 40. A concrete procedure of the embodiment refers to this map and reads the reference phase ψb corresponding to the torque command Tm2* and the rotation speed Nm2 of the motor MG2 from the map at step S110. In the case of a positive value of the rotational angle detection error θerr, that is, in the case of detection of the rotational angle θ to be larger than a true value, the upper limit phase ψul and the lower limit phase ψll are set to correction values of the reference phases ψb and −ψb corrected by the value θerr in an advanced direction (see a one-dot chain line curve in FIG. 5). In the case of a negative value of the rotational angle detection error θerr, that is, in the case of detection of the rotational angle θ to be smaller than the true value, on the other hand, the upper limit phase ψul and the lower limit phase ψll are set to correction values of the reference phases ψb and −ψb corrected by the value θerr in a lag direction (see a two-dot chain line curve in FIG. 5).

After setting the upper limit phase ψul and the lower limit phase ψll, the CPU calculates a tentative voltage phase ψtmp as a tentative target value of the phase of the square wave voltage applied from the inverter 42 to the motor MG2 from the torque command Tm2* and the torque estimate Tm2est of the motor MG2 input at step S100 according to Equation (2) given below (step S120):

$$\psi tmp = kp \cdot (Tm2^* - Tm2est) + ki \cdot \int (Tm2^* - Tm2est) \cdot dt \quad (2)$$

Equation (2) is a relational expression of feedback control to minimize a difference (Tm2*−Tm2est) between the torque command Tm2* as a target torque and the torque estimate Tm2est as the output torque of the motor MG2. In Equation (2), 'kp' in a first term and 'ki' in a second term on the right side respectively denote a gain of a proportional term and a gain of an integral. The greater between the lower limit phase ψll and the smaller between the upper limit phase ψul and the tentative voltage phase ψtmp calculated at step S120 is set to a target voltage phase ψ* (step S130). The inverter 42 is controlled based on the rotational angle θ input at step S100 and the target voltage phase ψ* set at step S130 (step S140). A concrete procedure of the embodiment generates square wave pulse signals for the respective phases, U-phase, V-phase, and W-phase according to the rotational angle θ and the target voltage phase ψ* and performs switching control of the inverter 42 in response to the generated square wave pulse signals at step S140. On completion of the processing at step S140, the CPU returns to step S100 and repeats the processing of and after step S100.

As described above, in application of a square wave voltage from the inverter 42 to the motor MG2 to make the motor MG2 output a torque equivalent to the torque command Tm2* according to the square wave control routine of FIG. 4, the hybrid vehicle 20 of the embodiment corrects the reference phases ψb and −ψb as the phases for maximizing the absolute value of the output torque of the motor MG2 with the rotational angle detection error θerr and sets the corrected values to the upper limit phase ψul and the lower limit phase ψll of the square wave voltage (step S110). The target voltage phase ψ* of the square wave voltage is set within a specific phase range defined by the upper limit phase ψul and the lower limit phase ψll to reduce the torque difference between the torque command Tm2* and the torque estimate Tm2est as the output torque of the motor MG2 (steps S120 and S130). The inverter 42 is controlled based on the target voltage phase ψ* and the rotational angle θ of the rotor in the motor MG2 detected by the rotational position detection sensor 44 (step S140). Namely the square wave control of this embodiment sets the upper limit phase ψul and the lower limit phase ψll of the square wave voltage by taking into account the rotational angle detection error θerr as the detection error of the rotational position detection sensor 44, and sets the target voltage phase ψ* of the square wave voltage within the phase range defined by the upper limit phase ψul and the lower limit phase ψll. This arrangement prevents the actual phase of a square wave voltage from being out of a range defined by the phases for maximizing the absolute value of the output torque of the motor MG2 (the reference phases ψb and −ψb) due to the rotational angle detection error θerr, while preventing untimely limitation of an actual phase change of the square wave voltage before reaching the phases for maximizing the absolute value of the output torque of the motor MG2 (the reference phases ψb and −ψb). This arrangement thus ensures output of a torque, which is expected to be output from the motor MG2.

Figure 6:
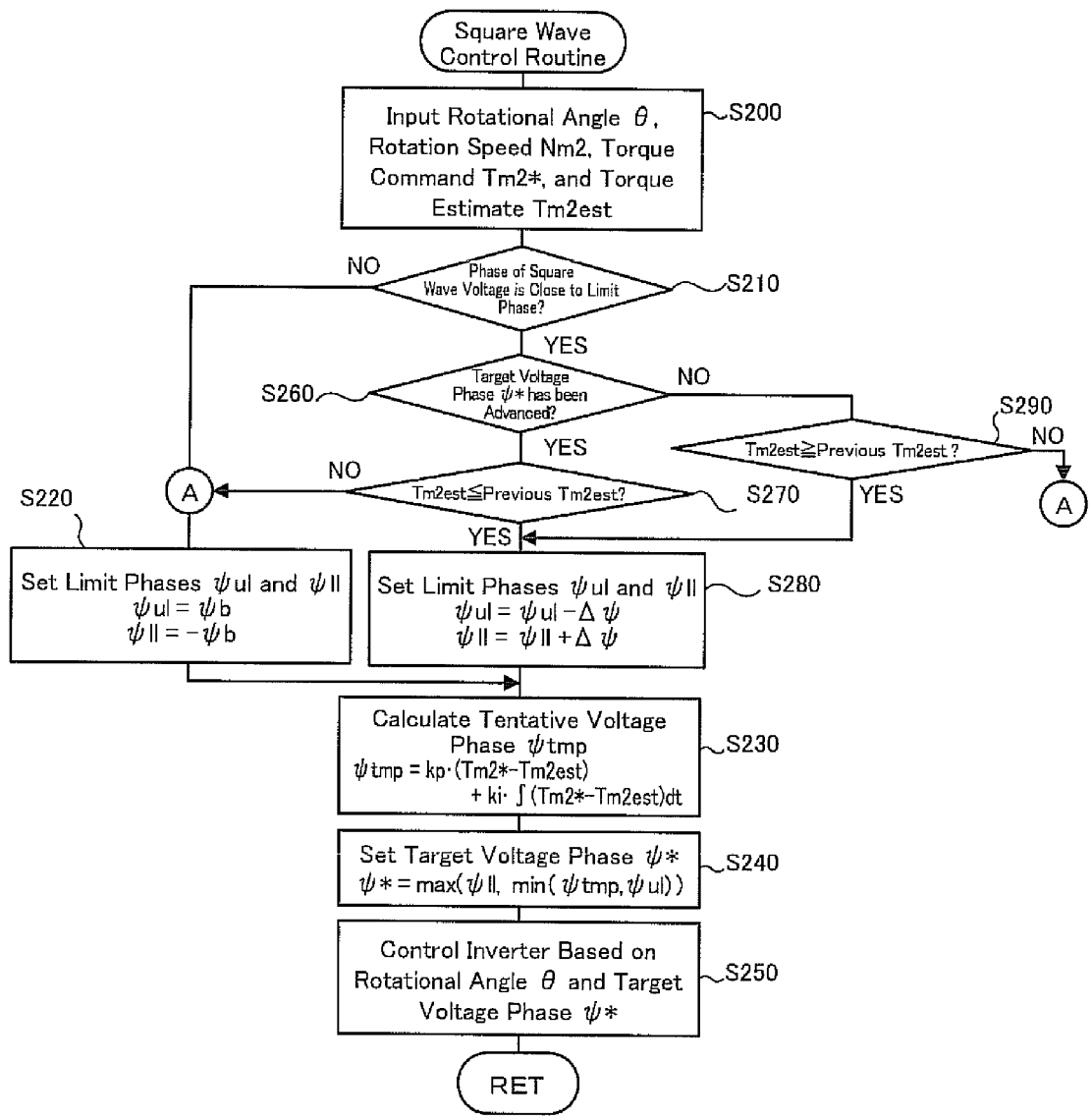
FIG. 6 is a flowchart showing a modified flow of the square wave control routine.

FIG. 6 is a flowchart showing a modified flow of the square wave control routine. The modified square wave control routine of FIG. 6 is repeatedly performed at preset time intervals by the motor ECU 40 of the embodiment to control the motor MG2 by the square wave control method in the hybrid vehicle 20 of the embodiment. The modified square wave control routine of FIG. 6 is similarly performed to control the motor MG1 by the square wave control method.

On the start of the square wave control routine of FIG. 6, the CPU (not shown) of the motor ECU 40 inputs various data required for control, for example, the rotational angle θ of the rotor in the motor MG2 detected by the rotational position detection sensor 44, the present rotation speed Nm2 of the motor MG2, the torque command Tm2* of the motor MG2 set by the hybrid ECU 70, and the torque estimate Tm2*est* (step S200). After the data input at step S200, a previous value of the target voltage phase ψ*set in a previous cycle of this routine is compared with a result of subtraction of a preset value from a previous value of the upper limit phase ψul and with a result of addition of a preset value to a previous value of the lower limit phase ψll. The CPU determines whether the phase of the square wave voltage is close to the upper limit phase ψul or the lower limit phase ψll, based on the result of such comparison (step S210). Upon determination at step S210 that the phase of the square wave voltage is not close to the upper limit phase ψul or the lower limit phase ψll, the CPU sets the reference phase ψb and the reference phase −ψb corresponding to the torque command Tm2* and the rotation speed Nm2 read from a map similar to the map used at step S110 in the flowchart of FIG. 4 to the upper limit phase ψul and the lower limit phase ψll (step S220). The CPU subsequently calculates the tentative voltage phase ψtmp as the tentative target value of the phase of the square wave voltage applied from the inverter 42 to the motor MG2 from the torque command Tm2* and the torque estimate Tm2*est* of the motor MG2 input at step S200 according to Equation (2) given previously (step S230). After setting the tentative voltage phase ψtmp, the CPU sets the target voltage phase ψ* (step S240) in the same manner as step S130 in the flowchart of FIG. 4 and controls the inverter 42 (step S250) in the same manner as step S140 in the flowchart of FIG. 4. The CPU then returns to step S200 and repeats the processing of and after step S200.

Upon determination at step S210 that the phase of the square wave voltage is close to the upper limit phase ψul or the lower limit phase ψll, on the other hand, the CPU identifies whether the target voltage phase ψ* has been advanced (increased) in the previous cycle of this routine (step S260). When it is determined at step S260 that the target voltage phase ψ* has been advanced in the previous cycle of this routine, the CPU further determines whether a present value of the torque estimate Tm2*est* input at step S200 in the present cycle of this routine is not greater than a previous value of the torque estimate Tm2*est* input at step S200 in the previous cycle of this routine (step S270). The affirmative answer at step S270 that the present value of the torque estimate Tm2*est* is not greater than the previous value of the torque estimate Tm2*est* means no increase (but a decrease) of the output torque of the motor MG2 irrespective of the advance of the phase ψ of the square wave voltage. In response to the affirmative answer at step S270, the CPU accordingly sets the upper limit phase ψul and the lower limit phase ψll by subtracting a preset value Δψ (for example, in a range of about 5 degrees to 10 degrees) from the present value of the upper limit phase ψul and adding the preset value Δψ to the present value of the lower limit phase ψll (step S280). The CPU then performs the processing of steps S230 to S250 as described above and returns to step S200 to repeat the processing of and after step S200. In response to a negative answer at step S270, on the other hand, the CPU performs the processing of and after steps S220 to S250 as described above and returns to step S200 to repeat the processing of and after step S200.

When it is determined at step S260 that the target voltage phase ψ* has not been advanced in the previous cycle of this routine, on the other hand, the CPU further determines whether the present value of the torque estimate Tm2*est* is not smaller than the previous value of the torque estimate Tm2*est* (step S290). The affirmative answer at step S290 that the present value of the torque estimate Tm2*est* is not smaller than the previous value of the torque estimate Tm2*est* means no decrease (but an increase) of the output torque of the motor MG2 irrespective of the lag of the phase ψ of the square wave voltage. In response to the affirmative answer at step S290, the CPU accordingly sets the upper limit phase ψul and the lower limit phase ψll by subtracting a preset value Δψ (for example, in a range of about 5 degrees to 10 degrees) from the present value of the upper limit phase ψul and adding the preset value Δψ to the present value of the lower limit phase ψll (step S280). The CPU then performs the processing of steps S230 to S250 as described above and returns to step S200 to repeat the processing of and after step S200. In response to a negative answer at step S290, on the other hand, the CPU performs the processing of and after steps S220 to S250 as described above and returns to step S200 to repeat the processing of and after step S200.

As described above, in application of a square wave voltage from the inverter 42 to the motor MG2 to make the motor MG2 output a torque equivalent to the torque command Tm2* according to the modified square wave control routine of FIG. 6, the reference phases ψb and −ψb as the phases for maximizing the absolute value of the output torque of the motor MG2 are set to the upper limit phase ψul and the lower limit phase ψll of the square wave voltage (step S220). In the case of no increase of the output torque of the motor MG2 irrespective of the advance of the phase of the square wave voltage (step S270: yes) or in the case of no decrease of the output torque of the motor MG2 irrespective of the lag of the phase of the square wave voltage (step S290: yes), the upper limit phase ψul and the lower limit phase ψll are corrected to narrow the phase range defined by the upper limit phase ψul and the lower limit phase ψll (step S280). The target voltage phase ψ* of the square wave voltage is set within a specific phase range defined by the upper limit phase ψul and the lower limit phase ψll to reduce the torque difference between the torque command Tm2* and the torque estimate Tm2*est* as the output torque of the motor MG2 (steps S230 and S240). The inverter 42 is controlled based on the target voltage phase ψ* and the rotational angle θ of the rotor in the motor MG2 detected by the rotational position detection sensor 44 (step S250). Namely the modified square wave control corrects the upper limit phase ψul and the lower limit phase ψll of the square wave voltage according to the relation of the torque estimate Tm2*est* as the torque actually output from the motor MG2 to the setting condition of the phase of the square wave voltage, and sets the target voltage phase ψ* of the square wave voltage within the phase range defined by the upper limit phase ψul and the lower limit phase ψll. This arrangement prevents the actual phase of a square wave voltage from being out of a range defined by the phases for maximizing the absolute value of the output torque of the motor MG2 (the reference phases ψb and −ψb) due to any of various factors, such as a detection error of the rotational position detection sensor 44 or the effect of the ambient environmental temperature. This arrangement thus ensures output of a torque, which is expected to be output from the motor MG2.

Figure 7:
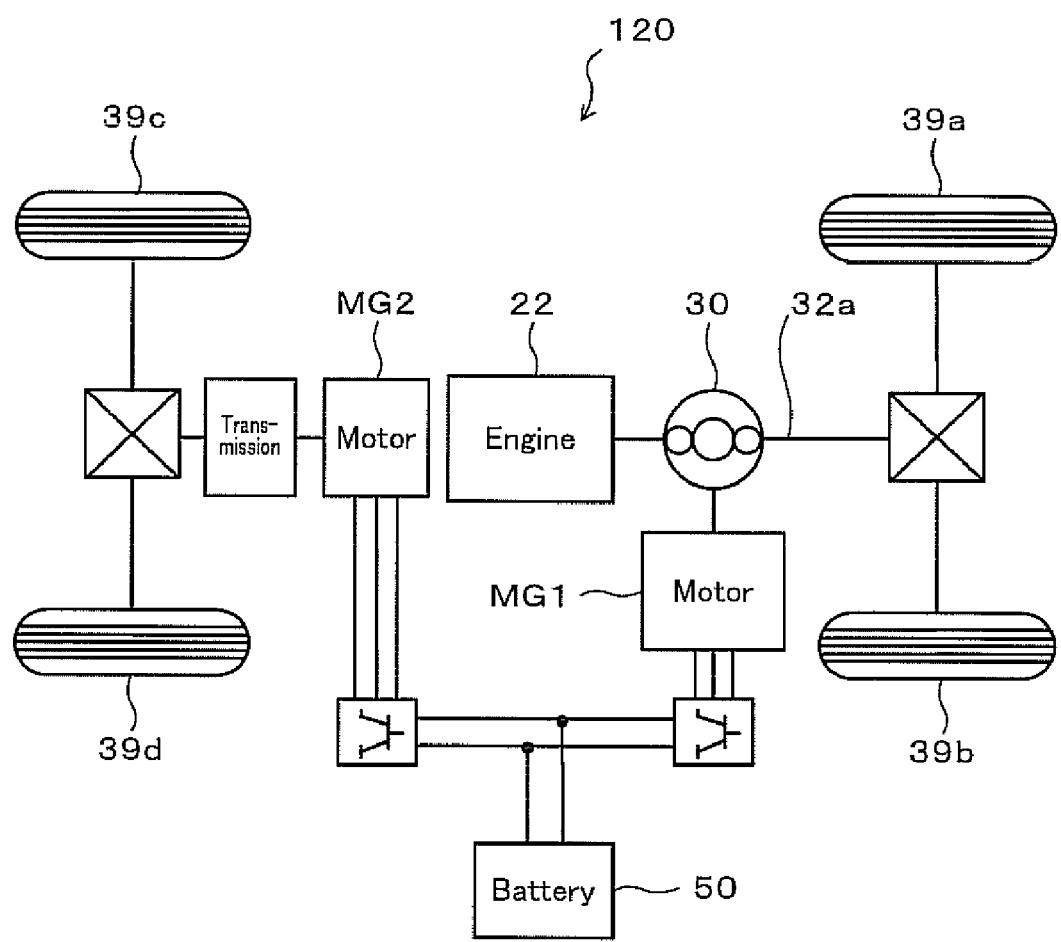
FIG. 7 schematically illustrates the configuration of another hybrid vehicle in one modified example.

In the hybrid vehicle 20 of the embodiment, the ring gear shaft 32*a* as the axle and the motor MG2 are interconnected via the reduction gear 35 arranged to reduce the rotation speed of the motor MG2 and transmits the reduced rotation speed to the ring gear shaft 32*a*. The reduction gear 35 may be replaced by a transmission designed to have two different speeds, for example, Hi and Lo or three or a greater number of different speeds and configured to change the rotation speed of the motor MG2 and transmit the changed rotation speed to the ring gear shaft 32*a*. In the hybrid vehicle 20 of the embodiment, the power of the motor MG2 is output to the axle connecting with the ring gear shaft 32*a*. The scope of the invention is, however, not restricted to the hybrid vehicle of this configuration. The technique of the invention is also applicable to a hybrid vehicle 120 of a modified configuration shown in FIG. 7. In the hybrid vehicle 120 of FIG. 7, the power of the motor MG2 is connected to another axle (an axle linked with wheels 39c and 39d) that is different from the axle connecting with the ring gear shaft 32a (the axle linked with the wheels 39a and 39b). The engine 22 is not restricted to the internal combustion engine designed to consume a hydrocarbon fuel, such as gasoline or light oil, and thereby output power, but may be an engine of any other design, for example, a hydrogen engine. The motors MG1 and MG2 are not restricted to the synchronous generator motors but may be motors of any other configuration or design, for example, induced motors.

The primary elements in the embodiment and its modified examples are mapped to the primary constituents in the claims of the invention as described below. The inverter 42 arranged to use the voltage supplied from the battery 50 as the dc power source and drive the motor MG2 in the embodiment corresponds to the 'inverter' in the claims of the invention. The rotational position detection sensor 44 of detecting the rotational angle θ or the rotational position of the rotor in the motor MG2 in the embodiment corresponds to the 'rotational position detector' in the claims of the invention. The motor ECU 40 performing the rotational angle detection error calculation routine (not shown) to calculate the rotational angle detection error θerr as the angle deviation in every 60 degrees in the embodiment is equivalent to the 'error acquisition module' in the claims of the invention. The motor ECU 40 performing the processing of step S110 in the control routine of FIG. 4 in the embodiment is equivalent to the 'limit phase setting module' in the claims of the invention. The motor ECU 40 performing the processing of steps S120 and S130 in the control routine of FIG. 4 in the embodiment is equivalent to the 'target voltage phase setting module' in the claims of the invention. The motor ECU 40 performing the processing of step S140 in the control routine of FIG. 4 in the embodiment is equivalent to the 'inverter controller' in the claims of the invention. The motor ECU 40 performing the processing of step S200, the motor ECU 40 performing the processing of steps S210 to S290, the motor ECU 40 performing the processing of steps S230 and S240, and the motor ECU 40 performing the processing of step S250 in the modified control routine of FIG. 6 are equivalent to the 'output torque acquisition module', the 'limit phase setting module', the 'target voltage phase setting module', and the 'inverter controller' in the claims of the invention, respectively.

The 'rotational position detector' of the invention is not restricted to the rotational position detector sensor 44 structured as a resolver but may be any other structure of detecting the rotational position of the rotor in the AC motor. The 'error acquisition module' of the invention is not restricted to the motor ECU 40 of calculating the rotational angle detection error θerr based on the technique disclosed in Japanese Patent Publication No. 4,007,197 but may be any other configuration of obtaining a detection error of the rotational position detector. The 'limit phase setting module' of the invention is not restricted to the motor ECU 40 but may be any other configuration of correcting the phases of the square wave voltage for maximizing the absolute value of the output torque of the AC motor with the detection error of the rotational position detector and setting the corrected phases to the limit phases of the square wave voltage. The 'target voltage phase setting module' of the invention is not restricted to the motor ECU 40 but may be any other configuration of setting the target voltage phase of the square wave voltage within the phase range defined by the limit phases to reduce the torque difference between the target torque and the output torque of the AC motor. The 'inverter controller' of the invention is not restricted to the motor ECU 40 but may be any other configuration of controlling the inverter based on the rotational position of the rotor in the AC motor and the target voltage phase. The 'output torque acquisition module' of the invention is not restricted to the motor ECU 40 but may be any other configuration of detecting or estimating the output torque of the AC motor. The 'limit phase setting module' of the invention is not restricted to the motor ECU 40 but may be any other configuration of setting the phases of the square wave voltage for maximizing the absolute value of the output torque of the AC motor to the limit phases and correcting the limit phases to narrow the phase range defined by the limit phases in the case of no increase of the output torque irrespective of the advance of the phase of the square wave voltage or in the case of no decrease of the output torque irrespective of the lag of the phase of the square wave voltage. The above mapping of the primary elements in the embodiment and its modified examples to the primary constituents in the claims of the invention is not restrictive in any sense but is only illustrative for concretely describing the modes of carrying out the invention. The scope and spirit of the present invention are indicated by the appended claims, rather than by the foregoing description.

Namely the embodiment and its modified examples discussed above are to be considered in all aspects as illustrative and not restrictive. There may be many other modifications, changes, and alterations without departing from the scope or spirit of the main characteristics of the present invention.

The technique of the present invention is preferably applied to the manufacturing industries of motor drive control apparatuses.

What is claimed is:

1. A motor drive control apparatus configured to control operation of an AC motor, the motor drive control apparatus comprising:
    an inverter arranged to use a voltage supplied from a DC power source and drive the AC motor;
    a rotational position detector arranged to detect a rotational position of a rotor in the AC motor;
    an error acquisition module configured to obtain a detection error of the rotational position detector;
    a limit phase setting module configured to, in application of a square wave voltage from the inverter to the AC motor to make the AC motor output a torque equivalent to a target torque, correct a phase of the square wave voltage for maximizing an absolute value of an output torque of the AC motor with the detection error of the rotational position detector obtained by the error acquisition module and to set the corrected phases to limit phases of the square wave voltage;
    a target voltage phase setting module configured to set a target voltage phase of the square wave voltage within a phase range defined by the limit phases set by the limit phase setting module, so as to reduce a torque difference between the target torque and the output torque of the AC motor; and
    an inverter controller configured to control the inverter based on the rotational position of the rotor in the AC motor detected by the rotational position detector and the target voltage phase set by the target voltage phase setting module.

2. A motor drive control method of making an AC motor output a torque equivalent to a target torque by using a voltage supplied from a DC power source and applying a square wave voltage from an inverter to the AC motor, the motor drive control method comprising the steps of:

(a) obtaining a detection error of a rotational position detector arranged to detect a rotational position of a rotor in the AC motor;

(b) correcting a phase of the square wave voltage for maximizing an absolute value of an output torque of the AC motor with the detection error of the rotational position detector obtained in the step (a) and setting the corrected phases to limit phases of the square wave voltage;

(c) setting a target voltage phase of the square wave voltage within a phase range defined by the limit phases set in the step (b), so as to reduce a torque difference between the target torque and the output torque of the AC motor; and (d) controlling the inverter based on the rotational position of the rotor in the AC motor detected by the rotational position detector and the target voltage phase set in the step (c).

3. A motor drive control apparatus configured to control operation of an AC motor, the motor drive control apparatus comprising:

an inverter arranged to use a voltage supplied from a DC power source and drive the AC motor;

an output torque acquisition module configured to obtain an output torque of the AC motor;

a limit phase setting module configured to, in application of a square wave voltage from the inverter to the AC motor to make the AC motor output a torque equivalent to a target torque, set phases of the square wave voltage for maximizing an absolute value of the output torque of the AC motor to limit phases of the square wave voltage and correcting the limit phases to narrow a phase range defined by the limit phases in the case of no increase of the output torque obtained by the output torque acquisition module irrespective of an advance of a phase of the square wave voltage and in the case of no decrease of the output torque obtained by the output torque acquisition module irrespective of a lag of the phase of the square wave voltage;

a target voltage phase setting module configured to set a target voltage phase of the square wave voltage within the phase range defined by the limit phases set by the limit phase setting module, so as to reduce a torque difference between the target torque and the output torque of the AC motor; and an inverter controller configured to control the inverter based on a rotational position of a rotor in the AC motor and the target voltage phase set by the target voltage phase setting module.

4. A motor drive control method of making an AC motor output a torque equivalent to a target torque by using a voltage supplied from a DC power source and applying a square wave voltage from an inverter to the AC motor, the motor drive control method comprising the steps of:

(a) setting phases of the square wave voltage for maximizing an absolute value of an output torque of the AC motor to limit phases of the square wave voltage and correcting the limit phases to narrow a phase range defined by the limit phases in the case of no increase of the output torque of the AC motor irrespective of an advance of a phase of the square wave voltage and in the case of no decrease of the output torque of the AC motor irrespective of a lag of the phase of the square wave voltage;

(b) setting a target voltage phase of the square wave voltage within the phase range defined by the limit phases set in the step (a), so as to reduce a torque difference between the target torque and the output torque of the AC motor; and (c) controlling the inverter based on a rotational position of a rotor in the AC motor and the target voltage phase set in the step (b).

* * * * *